US 6,647,706 B2

(12) United States Patent
Vogt et al.

(10) Patent No.: US 6,647,706 B2
(45) Date of Patent: Nov. 18, 2003

(54) TWO-CYLINDER MECHANISM FOR OPERATING BALING CHAMBER STUFFER

(75) Inventors: James Lee Vogt, Ottumwa, IA (US); Henry William Suechting, Jr., Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/983,956

(22) Filed: Oct. 25, 2001

(65) Prior Publication Data

US 2003/0106299 A1 Jun. 12, 2003

(51) Int. Cl.⁷ .............................. A01D 75/00; B30B 1/00
(52) U.S. Cl. .......................................... 56/341; 100/188
(58) Field of Search .......................... 56/341, 342, 343, 56/344; 100/188, 189

(56) References Cited

U.S. PATENT DOCUMENTS

| 2,409,478 A | * | 10/1946 | Dickow ...................... 100/142 |
| 3,938,652 A | * | 2/1976 | Sacht et al. .................. 198/507 |
| 4,106,268 A | | 8/1978 | White et al. |
| 4,132,163 A | | 1/1979 | White |
| 4,514,968 A | * | 5/1985 | Underhill ..................... 56/341 |
| 4,524,574 A | | 6/1985 | Ratzlaff |
| 4,569,282 A | * | 2/1986 | Galant ......................... 100/189 |
| 4,656,938 A | | 4/1987 | Webb et al. |
| 4,825,760 A | * | 5/1989 | Weddeling .............. 100/188 R |
| 5,842,335 A | | 12/1998 | Esau |
| 5,894,718 A | | 4/1999 | Hawlas et al. |

FOREIGN PATENT DOCUMENTS

| EP | 0 442 108 | 12/1990 |
| EP | 1 060 653 | 5/2000 |
| GB | 897 410 | 5/1962 |

* cited by examiner

Primary Examiner—Thomas B. Will
Assistant Examiner—Alicia Torres

(57) ABSTRACT

A large rectangular baler is provided with a crop material feeding arrangement including curved duct defining a pre-compression chamber from which a pre-compressed crop material charge is ejected, through an inlet of a baling chamber, by a stuffer arrangement. The duct includes a rear section curved about a horizontal, transverse axis and a stuffer frame, that carries a reciprocable tine arrangement, is mounted for rotation about this axis. A double acting injection cylinder reciprocates the tine arrangement between retracted and extended positions, respectively, wherein transversely spaced tines are withdrawn from, and extended into, slots provided in a top wall of the duct rear section. A double-acting hydraulic lift cylinder is provided for controlling the pivoting of the frame for effecting lifting of a pre-compressed charge of crop material and ejecting it through the baling chamber inlet.

9 Claims, 2 Drawing Sheets

TWO-CYLINDER MECHANISM FOR OPERATING BALING CHAMBER STUFFER

FIELD OF THE INVENTION

The present invention relates to large rectangular baler crop gathering arrangements, and, more particularly relates to a baling chamber stuffer device.

BACKGROUND OF THE INVENTION

In an attempt to achieve uniform density bales, it is known to provide large rectangular balers with a pre-compression chamber which accumulates a charge of crop to be baled. In response to the charge reaching a predetermined density, the stuffer device is actuated to move the charge into the baling chamber ahead of the plunger for packing the material to make a bale.

Heretofore, the mechanisms used to deliver the charge of pre-compressed crop to the baling chamber have been relatively complicated and expensive.

SUMMARY OF THE INVENTION

According to the present invention, there is provided an improved stuffer arrangement for delivering a pre-compressed charge of crop to the baling chamber.

An object of the invention is to provide a low cost stuffer mechanism for moving a preformed charge of crop material from an accumulation duct, forming a pre-compression chamber, to a bale chamber.

Another object of the invention is to provide a stuffer mechanism, as set forth in the immediately preceding object, which efficiently and quickly moves crop material from the accumulation duct.

A further object of the invention is to provide a stuffer mechanism which engages the preformed charge of crop material in the pre-compression chamber in such a way as to minimize leaf loss and maintain the shape of the charge of crop while moving it a substantial distance.

A more specific object of the invention is to provide a stuffer mechanism which is hydraulically powered and utilizes electronic controls for sequencing and timing an injector cylinder for moving stuffer teeth, substantially radially relative to a stuffer frame pivot, and a lifting cylinder for sweeping the stuffer teeth through the compression chamber for lifting the preformed charge of crop material into the baling chamber.

These and other objects will become apparent from a reading of the ensuing description together with the appended drawings.

DESCRIPTION OF THE PREFERRED EMBODIMENT

Figure 1:
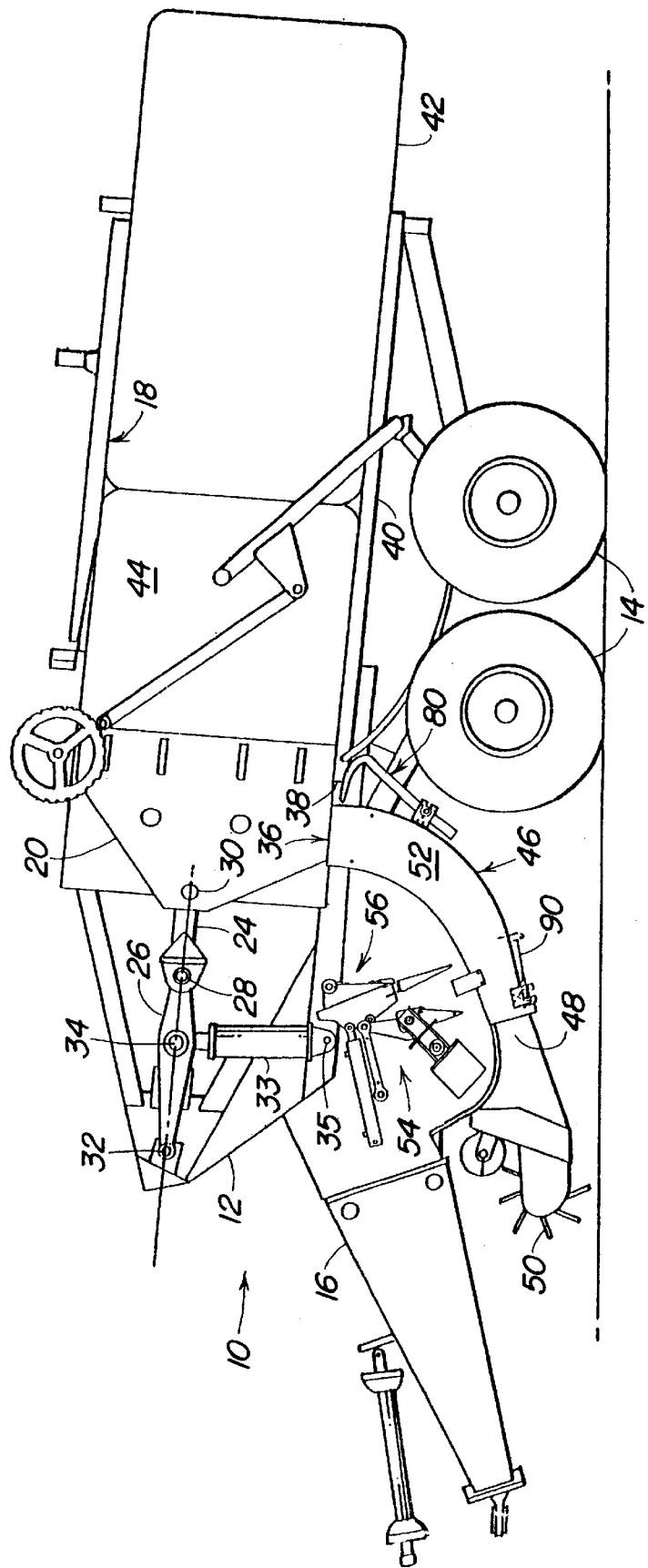
FIG. 1 is a somewhat schematic left side elevational view showing a large rectangular baler equipped with a stuffer mechanism constructed in accordance with the present invention, and with parts removed to reveal structure that would otherwise be hidden.

Referring now to FIG. 1, there is shown a large rectangular baler 10 including a frame 12 supported on a set of tandem wheels 14 for being towed over the ground by a tractor hitched to a tongue 16 fixed to, and projecting forwardly from a forward end of the frame 12.

A baling chamber 18 is supported by the frame 12 and extends fore-and-aft at a zone located above the wheels 14. A plunger 20 is mounted in a forward section of the chamber 18 for being reciprocated through the action of a toggle linkage defined by first and second links 24 and 26, respectively, coupled to each other at a pivotal connection 28, with the first link 24 being pivotally coupled to the plunger at a pin 30, and with the second link 26 being coupled to the frame 12 at a pin 32. When the plunger 20 is fully extended to the rear, as shown in FIG. 1, the pins 30 and 32 are located such that they lie along a longitudinal central axis of the baling chamber 18. A hydraulic plunger cylinder 33, for toggling the links 24 and 26, is then oriented nearly vertically in a collapsed condition and has its rod end pivotally coupled to the second link 26 at 34, and has its cylinder end coupled to the frame 12 at 35. Extension of the cylinder 34 will cause the link 26 to be pivoted upwardly about the pin 32 resulting in the plunger 20 being retracted to the extent that it uncovers a crop material inlet 36 extending entirely across a region forwardly of a stationary knife (not shown) provided across a forward end 38 of a bottom wall or floor 40 of the baling chamber 18.

Shown located within a rear portion of the baling chamber 18 is a completed bale 42, which is exiting the rear of the chamber 18; and located at a forward end of the bale 42 is a partially formed bale 44.

Provided for directing crop material into the chamber inlet 36 is a feed duct or chute 46 which is curved upwardly and rearwardly from an open forward end 48, disposed for receiving crop from a pick-up arrangement 50, to a rear end located at the baling chamber inlet 36. The chute 46 defines a pre-compression chamber 52 into which crop material is fed by a packer fork arrangement 54. Upon the material being pre-compressed to a pre-selected density, a stuffer arrangement 56 engages a pre-compressed charge of crop material and sweeps it from the chamber 52 and through the inlet 36 of the baling chamber 18.

Figure 2:
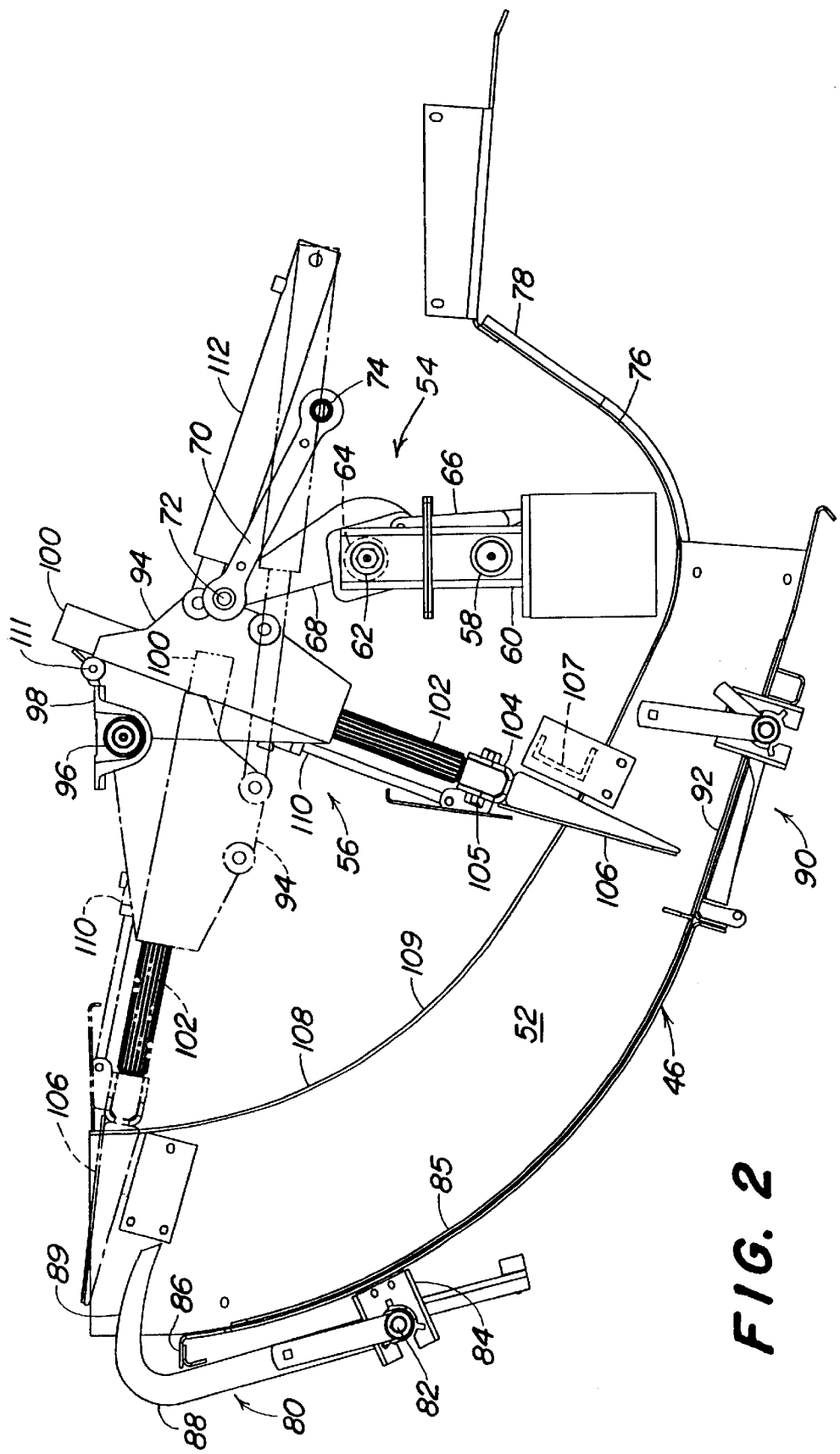
FIG. 2 is an enlarged, right side elevational view of the stuffer mechanism shown in FIG. 1.

Referring now to FIG. 2, it can be seen that the packer fork arrangement 54 includes a crank shaft 58 having opposite ends mounted for rotation in frame supports 60 and including a radially offset crank section 62 having a fork tine mounting tube 64 mounted to it for oscillating thereabout. Fixed at spaced locations along the tube 64 are a plurality of wedge-shaped packer tines 66. Fixed to opposite ends of the tube 64 and projecting in a direction opposite from the tines 66 are arms 68 having their radially outer ends respectively coupled to first ends of a pair of guide or radius links 70 by pins 72, with second ends of the radius links 70 being respectively pivotally anchored to the frame 12 by pivot pins 74. A reversible hydraulic motor (not shown) is coupled for driving the shaft 58 in the clockwise direction, as considered in FIG. 2, during normal baling operation so that the packer tines 66 are caused to reach through respective slots 76, provided in an upper, forwardly flared, forward wall section 78 of the duct 46, and sweep crop material rearwardly into the duct 46.

Provided for retaining crop material in the duct 46 until it has reached a predetermined degree of pre-compression, i.e., predetermined density, is a backstop arrangement 80 including a horizontal, transverse shaft 82 having opposite ends rotatably mounted in a pair of brackets 84 fixed to a bottom wall 85 of the duct at a location spaced from a lip 86 extending the width of, and defining a rear end of, the bottom wall 85. A plurality of hook-shaped fingers 88 are fixed at transversely spaced locations along the shaft 82 and include upper, forwardly extending finger ends 89 located at a height greater than that of the duct lip 86. The fingers 88 are pivoted with the shaft 82 between a blocking position, as shown, wherein the finger ends 89 extend over the lip 86 and into the end of the duct 46 so as to define an upper end of the pre-compression chamber 52, and a release position (not shown), wherein they are withdrawn from the duct 46 50 as to permit the free discharge of the pre-compressed charge of crop material out of the duct 46 and through the baling chamber inlet 36.

The backstop arrangement 80 operates in conjunction with a density sensor 90 including a hinged, spring-loaded, rectangular door 92 provided in, and extending across the width of, the bottom wall 85 of the duct 46 adjacent a forward end thereof in a location downstream from the area swept by the packer fork tines 66 of the packer assembly 54. The fingers 88 of the backstop arrangement 80 remain in their blocking position until the pressure of the compressed crop deflects the door 92 to an extent which corresponds to a condition when the pre-compressed charge of crop material reaches the pre-selected density. The density sensor 90 then sends a signal which actuates a controller (not shown) for the backstop arrangement 80 so that it is caused to be moved from its blocking position to its release position. The plunger cylinder 34 is then extended to retract the plunger 20 to a location forward of the baling chamber inlet 36, with the stuffer arrangement 56 then being operated to move the pre-compressed charge of crop material into the baling chamber 18.

Specifically, the stuffer arrangement 56 includes a frame 94 located centrally above the duct 46 and fixed to a transverse pivot shaft 96 that is mounted for rotation in bearing holders 98 that are fixed to the frame 12 at transversely spaced locations spaced substantially vertically above the density sensor 90. A guide tube 100 is fixed to the frame 94 and is oriented so as to be angled slightly rearward of vertical from top to bottom when the frame 94 is in an extreme forward position, as shown. The interior of the tube 100 is splined. Mounted for reciprocation in the tube 100 is a complementary-shaped slide member 102 having complementary splines formed thereabout along its length which engage the splines inside the tube 100 so as to prevent relative rotation between tube 100 and the slide member 102, for a purpose explained below. A lower end of the slide member 102 is received between opposite legs of a transversely extending tine support 104, that is U-shaped in cross section. The slide member 102 is fixed to the legs of the tine support 104 by spaced bolts 105 received in respective aligned sets of holes provided in the slide member 102 and the legs of the tine support 104. Fixed at transversely spaced locations along the length of the web of the tine support 104, as by welding, are a plurality of stuffer tines 106 that are wedge-shaped in profile and are arranged so that they taper to a point in a direction away from the tine support 104. A cross support 107, which is generally C-shaped in cross section, is fixed to, and forms a joint between, a forward end of an upper rear wall section 108 of the duct 46, that extends from the support 107 to the rear end of the duct 46, and the rear end of the flared, upper forward wall section 78 of the duct 46. The cross support 107 is located opposite from the door 92 in the lower duct wall 85, and extending rearwardly in the upper rear wall section 108 from a location adjacent the cross support 107 are a plurality of transversely spaced, longitudinally extending slots 109 that are aligned with the stuffer tines 106 so as to permit them to extend into and sweep along the duct 46. The splined coupling between the tube 100 and slide member 102 keep the tine support 104 oriented so that the tines 106 are maintained in alignment with the slots 109.

An extensible and retractable hydraulic injector cylinder 110 is coupled between a pivot coupling 111 carried by the frame 94 and stuffer tine support 104, the cylinder 110 being retracted, with the tines 106 withdrawn from the pre-compression chamber 52, when the stuffer arrangement 56 is in a forward, standby condition, shown in FIG. 1. Upon the crop material reaching the desired density within the chamber 52, the cylinder 110 is caused to extend to move the tines 106 into the chamber 52 so as to engage the pre-compressed charge of crop material located there, this position being shown in solid lines in FIG. 2. An extensible and retractable lift cylinder 112 is coupled between the main frame 12 and a central front location of the frame 94. The cylinder 112 is in a retracted condition when the stuffer arrangement 56 is in its forward position, and, when the fingers 88 of the backstop arrangement 80 are withdrawn from the end of the pre-compression chamber 52 and the injector cylinder 110 has been extended to place the tines 106 in the chamber 52, the cylinder 112 is extended to cause the tines 106 to sweep rearwardly through the pre-compression chamber 52 so as to eject the crop material located therein through the baling chamber inlet 36. It is to be noted that the lower and upper rear wall sections 85 and 108 are each located approximately at respective radii about the pivot shaft 96 so that the cross sectional dimension of the pre-compression chamber 52 remains approximately constant over the distance swept by the stuffer tines. Once the lift cylinder 112 has completed its extension stroke, the injector cylinder 110 will be retracted to withdraw the tines 106 from the pre-compression chamber 52, and then the lifting cylinder 112 will be retracted to return the stuffer arrangement 56 to its initial, forward standby position.

It is to be noted that, while the guide tube 100 and slide member 102 are the preferred construction for controlling the movement of the tines 106, conceivably the tines 106 could be mounted to a member forming one side of a four-bar linkage arranged such that the tines 106 move along a near straight-line path between their retracted and extended positions. Also, while not preferred, it is conceivable that, instead of the hydraulic actuators 110 and 112, reversible electric linear motors could be used; or that the stuffer frame 94 could be gear driven or driven by a hydraulic motor having a rotary output shaft coupled to the frame 94.

Assuming the baler 10 to be in operation, with a tractor towing it along a windrow, and that the density sensor 90 has just sent a signal indicating that the crop material located in the pre-compression chamber 52 has just reached the desired density, the baler 10 will be in the condition of operation illustrated in FIG. 1. In this condition, the hook-shaped fingers 88 of the backstop arrangement 80 have just been rotated clockwise so as to withdraw the upper finger ends 89 from the chamber 52. At about the same time, the plunger cylinder 34 will be caused to extend so as to withdraw the plunger 20 to a location just forward of the baling chamber inlet 36. Coinciding with the withdrawal of the plunger 20, the tine injector cylinder 110 will be extended so as to push the tines 106 into the front of the pre-compressed crop material charge that has been packed into the chamber 52. Upon the complete extension of the injector cylinder 110, the lift cylinder 112 will be extended so as to cause the frame 94 of the stuffer arrangement 56 to be pivoted clockwise (FIG. 2) about the shaft 96 so that the stuffer tines 106 lift the pre-compressed charge of crop material through the baling chamber inlet 36, and, thus, into the baling chamber 18 ahead of the plunger 20. The plunger cylinder 34 is then retracted so as to cause the plunger 20 to move to the rear to compress the charge of crop material against the partially formed bale 44, the rearward movement of which meets with a frictional resistance determined by a tensioning mechanism (not shown).

Once the charge of crop material leaves the pre-compression chamber 52 the density sensor door 92 is reset and a signal is sent to effect the operation of the actuator for the backstop arrangement 80 so as to cause the fingers 88 to be rotated so as to place the finger ends 89 into the top of the chamber 52. Furthermore, once the charge of crop material is ejected from the chamber 52, the injection and lift cylinders 110 and 112, respectively, are retracted so as to move the stuffer arrangement 56 back to its standby position, shown in FIG. 1.

Having described the preferred embodiment, it will become apparent that various modifications can be made without departing from the scope of the invention as defined in the accompanying claims.

What is claimed is:

1. In a large rectangular baler including an elevated baling chamber having a floor provided with a crop material inlet, an upwardly and rearwardly curved duct defining a pre-compression chamber having an upper rear end located at said inlet, and a lower front end located for receiving crop material, and a stuffer arrangement including a tine assembly including a plurality of transversely spaced tines movable into said duct through slits provided in an upper rear wall section of said duct for lifting a pre-compressed charge of crop material, contained in said duct between said lower front and upper rear ends, and ejecting it through said inlet of said baling chamber, the improvement comprising: said duct including a rear section formed at least approximately at a radius about a horizontal transverse axis; said stuffer arrangement further including a frame mounted for pivoting about said horizontal, transverse axis; said tine assembly of said stuffer arrangement being mounted to said frame for reciprocation relative to said frame in a direction substantially crosswise to said duct between a retracted position wherein said tines are withdrawn from said duct and an extended position wherein said tines respectively project through said slits and into said duct; an extensible and retractable injector actuator being coupled to said tine assembly for selectively moving it between said retracted and extended positions; and an extensible and retractable lift actuator coupled to said frame and being selectively operable for pivoting said frame about said horizontal axis so as to sweep said tines through said duct for lifting said charge of crop material and discharging it through said inlet.

2. The large rectangular baler defined in claim 1 wherein an elongate guide tube is fixed to said frame and is oriented in said direction crosswise to said duct; said tine assembly including an elongate slide member shaped complementary to, and slidably received in, said guide tube; and said injector actuator being coupled between said frame and said slide member for selectively shifting it within said guide tube.

3. The large rectangular baler defined in claim 2 wherein said tine assembly includes an elongate tine support extending parallel to said horizontal axis and being fixed to said elongate slide member; said plurality of tines being secured to said tine support at respective locations spaced along it; and the coupling of said injector actuator with said slide member being established by said injector actuator being coupled directly to said tine support.

4. The large rectangular baler defined in claim 3 wherein said tine support is U-shaped in cross section; and said slide member being an elongate bar having an end portion located between, and fastened to, opposite legs of said tine support.

5. The large rectangular baler defined in claim 1 wherein said injector and lift actuators are each extensible and retractable hydraulic cylinders.

6. In a crop material feeding arrangement for feeding pre-compressed crop material charges into a baling chamber by way of a baling chamber inlet provided at a floor of said baling chamber, said crop feeding arrangement including: a duct having a rear section communicating with said inlet and defining a pre-compression chamber curved about a horizontal transverse axis and adapted for receiving and accumulating crop material until it forms a charge having a pre-selected density; said rear section of said duct having an upper wall defining a plurality of longitudinal slots extending substantially an entire length of said rear section of said duct; a stuffer arrangement for moving a given pre-compressed crop material charge from said rear section of said duct and including a frame; said stuffer arrangement further including a tine assembly including a plurality of transversely spaced tines; a mounting arrangement coupling said tines to said frame for at least approximate reciprocable movement, relative to said frame, between a retracted position, wherein said tines are located outside said duct, and an extended position, wherein said tines respectively project through said slots into said duct; said frame being mounted for pivoting about said horizontal transverse axis for moving said tine assembly so as to sweep along substantially said entire length of said rear section of said duct while said tines are located within said duct an injector actuator coupled between said frame and said tine assembly for moving the latter between said extended and retracted positions; and a lift actuator coupled to said frame for pivoting it so as to cause said tines of said tine assembly to be swept along said rear section of said duct.

7. The crop material feeding arrangement defined in claim 6 wherein said tine assembly includes a slide member; and a guide member fixed to said frame and defining a slide path extending crosswise to said duct; and said slide member being received by said guide member for reciprocating along said slide path.

8. The crop material feeding arrangement defined in claim 7 wherein said slide member is defined by an elongate bar; said guide member being in the form of a tube, with said bar and tube having respective cross sections which are complementary to each other; and said bar being received in said tube for sliding within it.

9. The crop material feeding arrangement defined in claim 8 wherein said injector and lift actuators are each extensible and retractable hydraulic cylinders.

* * * * *